Inventor:
Helmut Junghans
By Young, Emery & Thompson
Attorneys

Patented Apr. 30, 1940

2,198,729

UNITED STATES PATENT OFFICE 2,198,729

SHUTTER FOR PHOTOGRAPHIC APPARATUS

Helmut Junghans, Schramberg-Sulgen, Eckenhof, Wurtemberg, Germany

Application July 23, 1937, Serial No. 155,332
In Germany August 22, 1936

6 Claims. (Cl. 95—63)

This invention relates to shutters for photographic apparatus, in which use is made, generally speaking, of springs, i. e., both coil springs as well as spiral springs, or other power-storing means.

Shutters of this nature require to be adjusted for very different rates of movement, which are very high in the case of extremely short instantaneous exposures. Generally speaking, one single spring does not suffice for power-storing purposes, as a spring of this character must operate in reliable fashion both in respect of the slow as well as the very rapid shutter movements, which usually does not coincide with the characteristic of the spring. For this reason springs have been variously employed which are too powerful in themselves to be able properly to perform the slow rates of movement of the shutter. This, however, has been counter-balanced by the provision of special brakes for the slow shutter movements, these brakes causing the force of the spring to be consumed to a greater or smaller extent.

Arrangements of this nature, however, are accompanied by various disadvantages, particularly owing to the fact that the braking force does not remain constant, so that inaccuracies very quickly result, on the one hand due to wear of the braking means and on the other hand possibly also owing to a certain fatigue of the spring. A further proposal has accordingly also been made, which consists in making the main spring for the shutter merely of such strength that it operates satisfactorily in respect of the low and medium shutter speeds. In order to obtain the greater tension necessary for the higher shutter speeds there is then provided an auxiliary spring which is connected up for the higher speds and if necessary is also more or less greatly tensioned itself.

Although in this manner it is possible to obtain an extremely rapid movement of the shutter by means of comparatively weak springs which also operate satisfactorily in the lower range and may be employed without special brakes, there occurs in turn a very strong impact of the shutter, which is detrimental insofar as in this way the parts of the shutter are subjected to considerable strain, whilst on the other hand there is also the possibility that the parts of the shutter when reaching the extreme position again rebound from the stops to a certain extent owing to their comparatively high speed, so that the laminations of the shutter may again be opened with consequent defective exposure.

It is the object of the present invention to overcome the disadvantages aforesaid, and this is accomplished by producing a braking or attenuation of the movement of the shutter in the case of high speeds, so that in the extreme position there can occur neither a strong impact of the parts of the shutter against the stops nor a rebounding of the parts. For this purpose, according to the invention, there is also employed an auxiliary spring in addition to the main spring, which latter operates correctly at the lower shutter speeds, but the auxiliary spring is so arranged and coupled with the main spring that the force of the main spring may be both assisted as well as retarded thereby. Both actions of the spring take effect during the same working stroke. The auxiliary spring may either be merely additionally connected or it may also be made regulable in its tension, so that it assists the force of the main spring dependent on the degree of its tension and naturally also results in a damping or attenuation of the shutter movement corresponding to the particular adjustment. There are accordingly obtained in this case, with the assistance of the auxiliary spring, different acceleration values and, in proportion thereto, attenuation values. The auxiliary spring is preferably so arranged and adjusted that the same is fully disconnected and has no effect on the main spring in the case of low and medium rates of movement of the shutter, and when it is connected exerts no twisting effect on the control means.

In this connection it is unimportant whether one or several auxiliary springs are connected singly or in combined fashion with the main spring, or also whether a plurality of main springs are provided in conjunction with one or more auxiliary springs.

An embodiment of the invention is illustrated by way of example in the accompanying drawing, in which.

Figure 1:
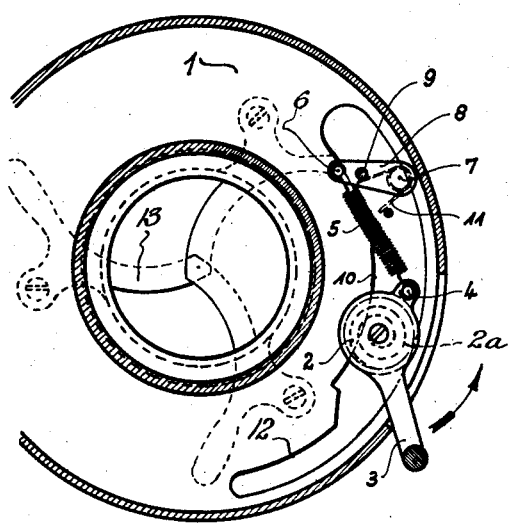
Fig. 1 shows the operating elements of a photographic shutter according to the invention in tne position of rest.

In the shutter casing 1 there is mounted in the manner known per se a spring casing 2 containing a regulable or non-regulable main spring 2a. There is secured to the spring casing a tensioning lever 3 having an eye 4 engaged by an auxiliary spring 5. The opposite end of this spring engages at 6 with the free end of a lever 8, which is mounted at 7 and may be acted upon by a weak spring 11 which seeks to rock the same clockwise. On the lever 8 there is also provided a stud 9 co-operating with a curved guide 10, 12, which is indicated merely by dash-dotted lines and may be provided in the cover plate of the casing 1 rotating about the axis of the lens.

Figure 2:
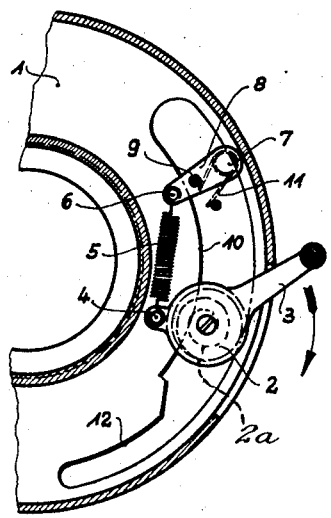
Fig. 2 shows the same parts with tensioned main spring but disconnected auxiliary spring.

In the position of rest the parts assume the position shown in Fig. 1, i. e., the spring 2a in the spring casing is more or less relaxed and the auxiliary spring 5 is also merely suspended between the lever 3 and the lever 8, which latter has been rocked to such extent by the spring 11 that the spring 5 does not hang loosely. In the corresponding position of the control guide 10, 12 the control stud 9 of the lever 8 does not contact with the edge of the guide. If now the lever 3 is rocked upwards out of this position in the direction of the arrow, the main spring located in the casing 2 is accordingly tensioned. At the same time the eye 4 moves into the position shown in Fig. 2, and it will be clear that the spring 5 also moves the lever 8, as the weak spring 11 is not able in any way to oppose this movement. When the shutter 13 has been released, the lever 3 moves downwards in the direction of the arrow in Fig. 2, in which connection merely the tension of the main spring in the casing 2 takes effect, the auxiliary spring 5 not having been tensioned. This arrangement suffices for the low and medium rates of movement of the shutter.

Figure 3:
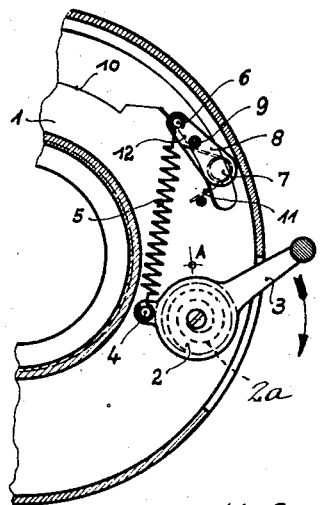
Fig. 3 is a similar view with tensioned main spring and connected and tensioned auxiliary spring.

On the other hand for the high shutter speeds there is rotated the disc having the control guide 10, 12, so that it moves approximately into the position according to Fig. 3. When the lever 3 is moved upwards out of the position according to Fig. 1 in the direction of the arrow the main spring is tensioned in the casing 2, and in addition, as shown by Fig. 3, the auxiliary spring 5 is also tensioned, as in this case the control stud 9 on the lever 8 is held by the narrow section 12 of the control guide 10, 12, so that the lever 8 is unable to yield to the pull of the spring 5.

A smaller or greater tensioning of the spring 5 may be caused dependent on the embodiment of the control guide 10, 12 and its adjustment in relation to the control stud 9 on the lever 8, so that in accordance with the spring force thus generated the force of the main spring in the casing 2 is assisted or increased when the shutter is released and the lever 3 is accordingly again moved downwards in the direction of the arrow in Fig. 3. This boosting effect of the auxiliary spring 5 extends approximately up to the point A in Fig. 3, i. e., up to the position in which the shortest distance again prevails between the eye 4 and the stud 6 on the lever 8. The lever 3, however, naturally continues to move downwards, but proceeding from this point varies the effect of the auxiliary spring, the latter being again somewhat tensioned up to the point where it reaches the basic position in Fig. 1 and accordingly acting in a retarding or damping fashion on the final part of the movement of the shutter blades. Since this damping effect is merely very weak immediately behind the point A and reaches its maximum only in the final position, the rate of movement of the shutter is not impaired so far as the opening and closing of the shutter is concerned. It is only when the laminations have again closed that the damping effect makes itself noticeable and accordingly absorbs the strong force during the very final movement of the parts. Since moreover, as stated in the above, there may be obtained by the form of the control guide 10, 12 and its adjustment in relation to the control stud 9 a different tension of the spring 5 occasioned by variation in the position of the lever 8, the damping effect produced by the spring 5 during the final part of the movement will depend on the adjustment of the guide and will be proportional to the previous supporting action on the main spring.

It would also be possible to provide in place of the one auxiliary spring a plurality of these springs, or a plurality of supporting springs in conjunction with a plurality of main springs, which latter in turn may also be regulable or non-regulable as desired.

What I claim as new and desire to secure by Letters Patent is:

1. A mechanism for operating the shutter blades of photographic apparatus comprising a main spring for operating the shutter blades and having a rotatable casing for tensioning the spring, a control guide adjustably mounted, a rotatable lever having a control means, and an auxiliary spring connected at one end to the lever and the other end to the casing at one side of the axis of rotation thereof, said guide having a portion which when adjusted will not cooperate with the control means so that the auxiliary spring will not be effective with the main spring but when the guide is adjusted to a second portion the control means will contact said guide to tension the auxiliary spring which when the shutter blades are actuated both springs act to operate the blades at greater speed but upon the final movement of the shutter blades the auxiliary spring will cause a damping effect when the end of the spring secured to the casing traverses to the other side of the axis.

2. A mechanism for operating the shutter blades of photographic apparatus comprising a main spring, means for tensioning the main spring, a lever pivotally mounted at one end, an auxiliary spring secured at one end to the other end of the lever and the other end to the means for tensioning the main spring at one side of the axis of rotation thereof, said auxiliary spring remaining untensioned at the low and medium speeds of the shutter blades by the rotation of the lever around its pivot when the main spring is tensioned, and means for preventing movement of the lever to tension the auxiliary spring when the main spring is tensioned for the high speeds of the shutter blades, said auxiliary spring also effecting a damping action during the final movement of the shutter blades for the high speeds of the blades when the end of the spring secured to the means for tensioning the main spring traverses to the other side of the axis.

3. A mechanism according to claim 2, in which the means for preventing movement of the lever is in the form of a control guide rotatably mounted to be rotated into and out of contact with the lever.

4. A mechanism according to claim 2, in which the lever is provided with a control stud and in which the means for preventing movement of the lever is in the form of a control guide rotatably mounted to be rotated into and out of contact with the lever by means of the stud.

5. A mechanism according to claim 2, in which the first-mentioned means is in the form of a casing having an eye and a tensioning lever and in which the auxiliary spring is connected to said eye.

6. A mechanism for operating the shutter blades of photographic apparatus comprising a main spring for operating the shutter blades, a rotatable member for tensioning the spring, a control guide adjustably mounted, a rotatable lever, and an auxiliary spring connected at one end to the lever and the other end to the member at one side of the axis of rotation thereof, said guide having a portion which when adjusted will not cooperate with the rotatable lever so that the auxiliary spring will not be effective with the main spring but when the guide is adjusted to a second portion the rotatable lever will contact said guide to prevent its rotation and thus tension the auxiliary spring which when the shutter blades are actuated both springs act to operate the blades at greater speed but upon final movement of the shutter blades the auxiliary spring will cause a damping effect when the end of the spring secured to the member traverses to the other side of the axis.

HELMUT JUNGHANS.